(12) United States Patent
Robinson et al.

(10) Patent No.: US 6,813,474 B2
(45) Date of Patent: Nov. 2, 2004

(54) SYSTEM AND METHOD FOR CREATING, PROCESSING AND MANAGING EDUCATIONAL CONTENT WITHIN AND BETWEEN SCHOOLS

(75) Inventors: Torrance Robinson, New York, NY (US); Daniel Watts, Brooklyn, NY (US); Charlene Noll, New York, NY (US); Alberto Garcia, Brooklyn, NY (US); Jose Garcia, Warren, NJ (US)

(73) Assignee: eChalk: L.L.C., New York, NY (US)

( * ) Notice: Subject to any disclaimer, the term of this patent is extended or adjusted under 35 U.S.C. 154(b) by 135 days.

(21) Appl. No.: 10/081,583

(22) Filed: Feb. 22, 2002

(65) Prior Publication Data

US 2002/0177109 A1 Nov. 28, 2002

Related U.S. Application Data

(60) Provisional application No. 60/271,144, filed on Feb. 24, 2001.

(51) Int. Cl.[7] .............................................. G09B 11/00
(52) U.S. Cl. ................... 434/353; 434/307 R; 713/182
(58) Field of Search ................................ 434/322, 323, 434/50, 353, 62, 365, 118, 307 R, 330, 362; 713/182, 200; 705/14

(56) References Cited

U.S. PATENT DOCUMENTS

| | | | | |
|---|---|---|---|---|
| 5,310,349 A | * | 5/1994 | Daniels et al. .............. | 434/350 |
| 5,778,072 A | * | 7/1998 | Samar .......................... | 380/30 |
| 5,864,869 A | * | 1/1999 | Doak et al. .............. | 707/104.1 |
| 5,907,831 A | * | 5/1999 | Lotvin et al. ................. | 705/14 |
| 6,006,333 A | * | 12/1999 | Nielsen ....................... | 713/202 |
| 6,149,441 A | * | 11/2000 | Pellegrino et al. .......... | 434/350 |
| 6,243,816 B1 | * | 6/2001 | Fang et al. ................. | 713/202 |
| 6,270,351 B1 | * | 8/2001 | Roper ......................... | 434/118 |
| 6,322,366 B1 | * | 11/2001 | Bergan et al. .............. | 434/118 |
| 6,438,353 B1 | * | 8/2002 | Casey-Cholakis et al. .. | 434/350 |
| 6,505,031 B1 | * | 1/2003 | Slider et al. ................ | 434/350 |
| 6,516,340 B2 | * | 2/2003 | Boys .......................... | 709/204 |
| 6,539,093 B1 | * | 3/2003 | Asad et al. ................. | 380/279 |
| 6,606,664 B2 | * | 8/2003 | Darago et al. ............. | 709/229 |
| 2002/0023059 A1 | * | 2/2002 | Bari et al. .................... | 705/76 |

* cited by examiner

Primary Examiner—John M. Hotaling, II
Assistant Examiner—Kathleen M. Christman
(74) Attorney, Agent, or Firm—Charles A. Rattner

(57) ABSTRACT

An educational content communications system that provides a system and method for creating, processing and managing educational content so that students, teachers, parents, and administrators (including staff) can better access, share, create, input, manage, store and/or deliver educational content. The educational content communication system is designed with the capability to create, process and manage educational content within a school, within and between a system of schools, within and between a community of schools, and within and between third-party providers of educational content.

27 Claims, 7 Drawing Sheets

SYSTEM AND METHOD FOR CREATING, PROCESSING AND MANAGING EDUCATIONAL CONTENT WITHIN AND BETWEEN SCHOOLS

CROSS REFERENCE TO RELATED APPLICATION

This application claims benefit of U.S. Provisional Application No. 60/271,144 filed Feb. 24, 2001, now abandoned, entitled "System and Method for Creating, Processing and Managing Education Content within and between Schools."

FIELD OF THE INVENTION

The present invention relates to a system and method for creating, processing and managing educational content. More specifically, the present invention relates to an Educational Content Communications System ("ECCS") that enables students, teachers, parents, and administrators (including staff) to access, share, create, input, manage, store and/or deliver educational content. The ECCS is designed to create, process and manage educational content within a school, within and between a system of schools, within and between a community of schools, and within and between third-party providers of educational content.

BACKGROUND OF THE INVENTION

Over the last few years, public and private schools in the United States have paid out large sums of money to purchase personal computers and connect these computers to the Internet. According to the National Center for Education Statistics, technology spending has grown from $2.1 billion to $5.4 billion. Local, State and Federal funds have greatly contributed to this effort and have helped ensure that over 90% of our schools are now connected to the Internet on some level. One of the largest contributors to this effort is E-rate, a two and a half billion annual federal fund run by the School and Libraries Division (SLD) that subsidizes kindergarten through Twelfth grade ("K–12").

Even with these investments, however, schools can derive only a small fraction of the potential benefit from their investment without an ECCS that enables the school's personal computers to access, share, input, manage, process, store and/or deliver educational content. Users or potential users of such an ECCS include the students, teachers, parents and administrators (including staff) of a school or district.

Unfortunately, many schools have taken the approach of not doing anything to develop an ECCS after investing in technology and access to the Internet. Many schools have little or no funds left in the budget after making their computer purchases and no staff with any particular expertise in designing, installing and maintaining information systems or in even understanding the potential benefits that might be achieved with an ECCS. For those schools that have attempted to develop an ECCS, the most common approach has been to purchase, install, and maintain a network to link the personal computers. To do this, schools have typically looked to the available off-the-shelf commercial networks such as Novell®, Lotus® Notes, and Microsoft® Exchange.

The costs of a private network make it prohibitive for many schools and are a significant financial drain for those schools that pursue this approach. The costs of the capital equipment, installation and ongoing maintenance of this type of network are significant with estimates from Microsoft® ranging up to $130 per user, per year. Depending on the school, the federal E-Rate program can provide anywhere from 20 to 90 percent of the funds for purchasing some, but not all, of the needed infrastructure and Internet access. The fund does not, however, cover any of the costs involved in the salaries of the people needed to keep such a system up and running (easily over half the cost of the system on an ongoing basis).

The few present networks that have been installed by schools are limited in that the users can only access the school's educational content from the personal computers within the school. Users are soon frustrated by the fact that their network is not accessible from all machines within the school or from machines outside the school. A school with an in-house network could try to implement this functionality by providing remote access capabilities but many who have investigated this have quickly learned that once faced with opening their closed network they expose themselves to security issues and viruses requiring even more hardware, software and support.

A further drawback to a private network is that such a network does not address the challenges presented by educational content from third-party providers. Many companies today are offering students a variety of Web-based educational services through the Internet. Third party programs are any type of content or information from these companies that needs to be delivered to a select user or group of users. Such examples of third party programs include, though are not limited to student assistance programs, supplemental information to help with a course or textbook, Web delivered applications, teacher training, parent consulting, video conferencing, grade books, attendance records and more. One of the main problems in managing this information is that each of these companies have their own Web sites with their own method of access and unique user identification and password. Schools would like, but do not have, an ECCS that can manage what third-party educational content programs each user or groups of users is authorized to access and that can provide a common access method in which the Web-based programs can be accessed from the ECCS.

Finally, an even larger payoff on schools' technology expenditures can be achieved if the ECCS can be linked to other schools. Administrators responsible for a system of schools such as a school district or a group of parochial schools would like, but do not presently have, a means to process and manage the educational content within a system of schools. In addition, groups sharing common interest would like, but do not have, a means to process and manage educational content between schools and districts including those that are not within any common school district or located outside their own. Schools would like this capability but this is not a feature that is feasible to implement with each school building their own private networks.

It was with this understanding of the problems of the prior art that formed the impetus for the present invention.

OBJECT AND SUMMARY OF THE PRESENT INVENTION

It is therefore an object of the present invention to provide an ECCS that enables the users of one or more schools to create, process and manage the educational content of the school(s).

It is another object of the present invention to provide an ECCS that does not require a school or system of schools to purchase any hardware or software to obtain ECCS functions.

It is another object of the present invention to provide an ECCS that is accessible by any communications device that has browser capabilities and access to the Internet, regardless of whether the communications device is located inside or outside the school.

It is another object of the present invention to provide an ECCS that will work with any public or private network that the school or school system has access to, including the Internet.

It is another object of the present invention to provide an ECCS that will enable the users of one school to process and manage educational content between other schools that are linked to the ECCS.

It is another object of the present invention to provide an ECCS that will enable administrators of a system of schools to process and manage educational content within a system of schools.

It is another object of the present invention to provide an ECCS that will enable a school or system of schools to process and manage educational content from third party providers and make it available to their students by a single user identification and password.

These, as well as other objects and advantages of the present invention, will become apparent in light of the following description, which details, by way of example, various aspects and features of the present invention.

Accordingly, generally speaking, and without intending to be limiting, one aspect of the present invention relates to an ECCS, preferably implemented over the Internet, which permits schools to make their educational content available to any school user with access to a communications device with browser capabilities and access to the Internet. The school's users can include, but do not have to be limited to, students, teachers, parents and administrators. The educational content is accessed, created, inputted, managed, processed stored and/or delivered using means which include, but are not limited, common calendars, file sharing, class room pages, club pages (for sports, clubs and other programs), e-mail and creation and posting of common links, and other means which will be discussed in more detail.

Again, generally speaking, and without intending to be limiting, another aspect of the present invention relates to an ECCS for managing educational content within a system of schools, whether it be a school district, county grouping of school districts, parochial school system or any other organized set of schools. This aspect of the present invention provides the ability for administrators of a system of schools to manage the educational content within a system of schools.

Again, generally speaking, and without intending to be limiting, another aspect of the present invention relates to an ECCS for managing school communities. Any type of sub-group community from within any or all the schools who are connected to the ECCS can be defined so that students, teachers, parents and administrators can process and manage educational content related to that community. These communities can cover any group the schools want to define such as the math club, the $7^{th}$ grade social studies teachers, the chess club, sports teams, etc.

Again, generally speaking, and without intending to be limiting, another aspect of the present invention relates to an ECCS for processing and managing third-party educational content. This aspect of the present invention permits administrators or other select users of schools or system of schools to provide users, whether they are students, teachers, parents or administrators, with access to Web-based third-party educational content through a single interface and without the necessity of knowing multiple user identifications and passwords.

The present invention is implemented through hardware and software, which provides each school or system of schools with its own Web site, which is accessible by typing its address on any Web browser. The Web site can serve as the school's communications portal, home page and/or virtual desktop through which the school's users can access the invention's ECCS functions. While the Internet is preferable, the present invention could also be implemented over a private intranet using different protocols. The present invention includes at least one server computer and at least one client computer including, respectively, server and client processors for executing server and client programs; and server and client input and output elements for communication between said server and client computer.

The above and other features will be more fully appreciated in view of a specific illustrative example presented hereinbelow in conjunction with the accompanying figures.

DETAILED DESCRIPTION OF THE INVENTION

Figure 1:
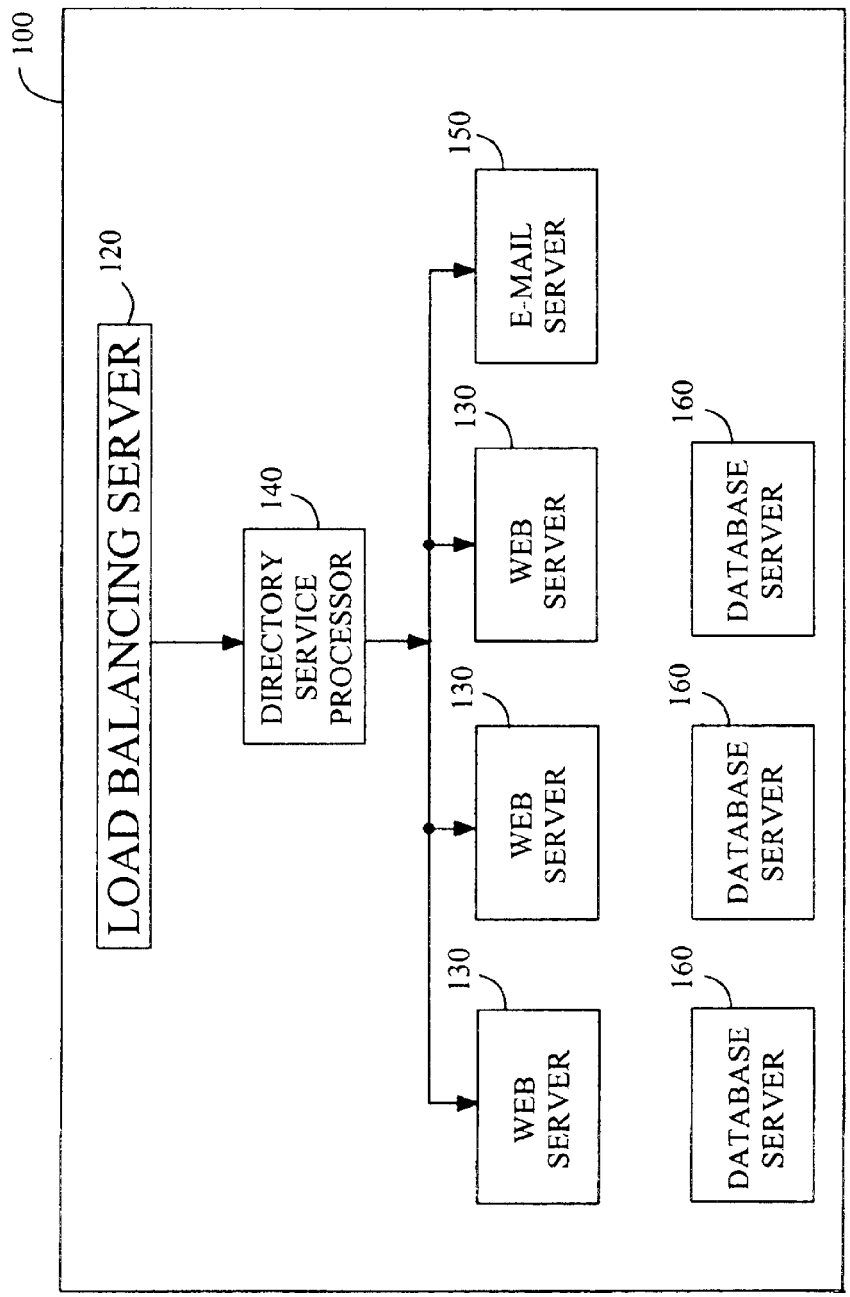
FIG. 1 schematically depicts eChalk, an illustrative example of the server portion of the present invention.

The present invention now will be described more fully hereinafter with reference to the accompanying drawings, in which an illustrative example of the present invention is shown. This invention may, however, be embodied in many different forms and should not be construed as limited to the illustrative example set forth herein; rather, this illustrative example is provided so that this disclosure will be thorough and complete, and will fully convey the scope of the invention to those skilled in the art.

The present invention is described below with reference to block diagrams and flow chart illustrations according to the illustrative example of the invention. It will be understood that each block of the block diagrams and the flow chart illustrations, and combinations of blocks in the block diagrams and combinations of blocks in the flow chart illustrations, can be implemented by computer program instructions. These computer instructions may be loaded onto a general purpose computer, special purpose computer, or other programmable data processing apparatus to produce a machine, such that the instructions which execute on the computer or other programmable data processing apparatus create means for implementing the functions specified in the block or blocks. It will be further understood that each block of the block diagrams and flow chart illustrations, and combinations of the respective blocks, can be implemented by a special purpose hardware-based computer system which perform the specified functions or steps, or combinations of special purpose hardware and computer instructions.

Glossary of Terms

The following terms are used throughout this application and are intended to have the following meaning.

Database

The term database is used herein as a logical grouping of data. It does not and should not be construed as defining a particular physical structure. It should be understood that one skilled in the art could implement a logical grouping of data using a variety of hardware and software configurations.

Educational Content

Educational content is defined broadly to encompasses any school or education related information and includes, but is not limited to, information associated with school policies, school events, classroom events, school sponsored clubs, curriculum requirements, course descriptions, class enrollments, homework assignments, exams, teacher training and teaching materials, and email.

ECCS

A communications and/or information system used for creating, managing and processing educational content.

School

The word school is used herein to refer to any organization or entity whose main purpose is educating the students of the organization or entity. Examples of schools include, but are not necessarily limited to, public and private organizations or entities teaching students in grades K–12, public and private colleges and universities, vocational training institutes and institutions and associations that work with K–12 schools and districts.

Internet

A collection of interconnected (public and/or private) networks that are linked together by a set of standard protocols (such as TCP/IP and HTTP) to form a distributed network. While this term is intended to encompass what is now commonly known as the Internet, it is also intended to encompass variations which may be made in the future, including changes and additions to existing standard protocols.

Create, Process and Manage

The terms "creating, managing and processing" or "create, manage and process" when used in context of describing the data processing functions of an ECCS is intended to encompass all standard data processing functions including, but not necessarily limited to, creating, entering, inputting, sharing, editing, storing, viewing and delivering educational content data.

World Wide Web ("Web")

A distributed collection of interlinked, user-viewable hypertext documents (commonly referred to as "Web documents" or "Web pages") that are accessible via the Internet, and the client-server software components which provide user access to such documents using standardized Internet protocols. Although the primary protocol now in use for allowing applications to locate and acquire Web documents is HTTP and Web pages are encoded using HTML, the terms "Web" and "World Wide Web" are intended to encompass fixture markup languages and protocols which may be used in place of (or in addition to) HTML and HTTP.

Web Browser(s)

The software program or programs that run on the computers or other access devices of the user/client and permit the user/client to request and receive content over the Internet are referred to as Web browsers.

Server/Web Servers

A Server as used herein refers to the software program or programs that perform all the functions requested of it by the software program or programs residing on client computers. A Web Server is a Server which performs the functions requested of it by the Web Browser(s) and delivers the requested content over the Internet to the Web Browser(s). The software program or programs which make up a Server can be physically located on one or more computers and such computers are referred to herein as either Server Computers or Web Server Computers if the software programs running on the computer perform as a Web Server.

The eChalk System

FIG. 1 schematically depicts eChalk, an illustrative example of the server portions of the present invention. The components of eChalk are a Load Balancing Server Computer (120), multiple Web Server Computers (130), a Directory Service Processor (140), and E-mail Server Computer (150) and multiple Database Server Computers (160). Any incoming communication to eChalk from the Internet (45) must first pass through the Load Balancing Server Computer (120). This server includes a firewall which is designed to exclude unauthorized access to eChalk. Communications that are not filtered by the firewall proceed to the load balancing functions of the Load Balancing Server Computer (120). The Load Balancing Server Computer (120) distributes the application workload over the Web Server Computers and allows eChalk to scale on demand, ensuring users of client computers a high rate of response.

The Directory Service Processor (140) is a software implementation of a directory service using LDAP protocol although the same functions could be performed using alternative products. In this implementation, the Directory Service Processor (140) runs on a separate server computer. The Directory Service Processor (140) maintains the relationship data that eChalk uses to relate a user with a particular school, a school with a particular district or other administrative entity, administrative entities with other administrative entities, and users within eChalk communities. The Directory Service Processor (140) processes all in-coming communications and serves as the single point of contact for relationships that have been defined. All other data (than what is maintained by the Directory Service Processor) is stored in the Database Server Computers (150).

The Load Balancing Server Computer (120) in this illustrative example is Arrow Point® C5-50, which includes a firewall. Every Web Server Computer (130) is capable of processing and managing the educational content and communication for any eChalk school or site. The Load Balancing Server is configured to distribute requests to Web Server Computers to optimize processing capacity. Additionally, high usage communities can be partitioned to use their own set of Web Servers Computers (130), which provides a greater level of service and reliability.

Each Web Server Computer (130) is configured with Microsoft® NT. The Web pages and associated applications of eChalk are implemented through Active Server Pages and Microsoft® Internet Information Services, Microsoft® C++, Java, and integrated software packages such as Infinite Interchange and Map Quest. The hardware for the Web Server Computers (130) are either Dell® 2400s, 2450s or 4300s. The Database Server Computers (150) are configured with Microsoft® SQL 7 and are running on Dell® 6400s, both 2 CPU and 4 CPU machines.

All the components illustrated in FIG. 1 are by way of example only. The invention is not limited to any hardware or software combination. The invention could be implemented, for example, on a Unix® platform and the purpose and number of servers could be reconfigured. In fact, once the educational content data being managed is large enough, the most cost effective implementation may be to move the data onto larger more scalable units. All educational content data could be stored on a large Terrabyte storage device, such as a SAN or a NAS utilizing fibre channel connections, from a company such as Dell®.

The eChalk Environment

Figure two represents an example of a school/district environment, which includes a district office and two schools.

An administrator (10), teacher (20), and student (30) at School 1 and School 2 are shown using personal computers (40) as communications devices. Each of these schools are linked to its own Internet Service Provider (50), through which the school's users can access eChalk (100) via the Internet (45). District A, which is responsible for managing the two schools is shown with two administrators (10) linked to its Internet Service Provider (50). For School 1, a parent (55) of a student is also shown with access to eChalk through a television with web access (60) and his or her own Internet Service Provider (50). Also shown on FIG. 1 are three third-party educational content providers (70), which can be linked by eChalk to the school's users.

What is shown here is a simplified school district for illustrative purposes only. In any implementation of the invention, there is no limit to the number of schools, users or providers of third party content that can be connected through the present invention. In addition, the users can be at any physical location so long as the users have access to a communications device with browser capabilities and access to the Internet.

It should also be understood that this invention could be implemented on a network other than the Internet. Although today the Internet is the common public network and the only available choice for most schools to implement the present invention, the invention could be implemented on any network that provides a means to link the school's users to the present invention. For example, the present invention could be implemented as the educational content communication system linking the school's users through a private intranet.

The eChalk Data and Data Management

Figure 3:
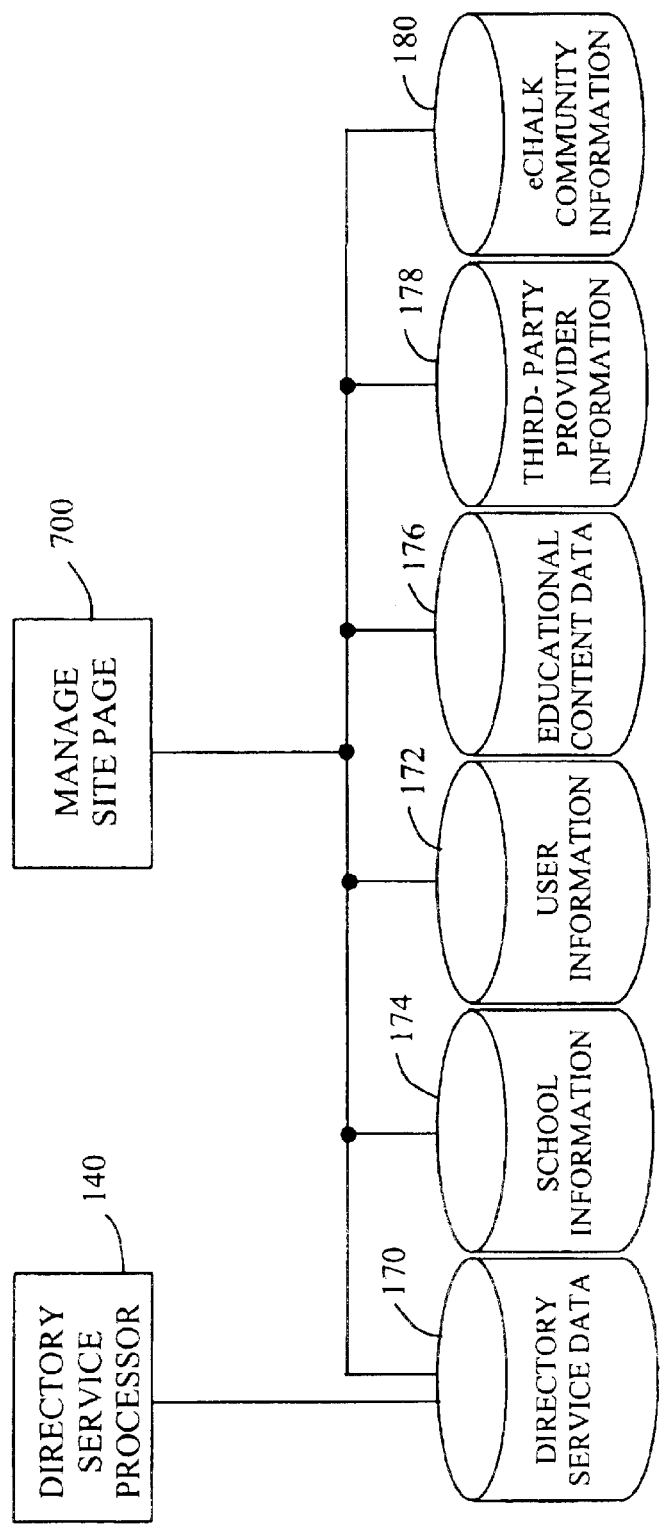
FIG. 3 is a block diagram depicting the categories of data managed by eChalk along with the associated data management functions.

Referring now to FIG. 3, a block diagram is depicted showing of the categories of data managed by eChalk along with the associated data management functions. These data categories are: (1) Directory Service Data (170), (2) User Information (172), (3) School Information (174), (4) Educational Content Data (176), (5) Third-Party Provider Information (178) and (6) e-Chalk Community Information (180). The data management functions are described in the last section of this Detailed Description.

Directory Service Data (170) is data that is maintained by the Directory Service Processor (140). This is the key relationship data that permits eChalk to associate each user (whether such user be a student, teacher, parent or administrator or other) with a particular school or other administrative entity such as a school district and with any eChalk communities that have been defined. If a system of schools is being managed by eChalk, the Directory Service Data (170) will include what schools belong to the system of schools and what the relationships are between the schools and other administrative entities established to manage a school. Thus, with respect to the simple example illustrated in FIG. 2, the Directory Service Data (170) would show School 1 and School 2 as being part of and managed by District A, the administrative entity.

The remaining categories of data are stored in Database Server Computers (150) and accessible through the Web Server Computers (130). User Information (172) can include whatever information a school wants to maintain on a user. Typically such information will include the type of user (student, teacher, administrator, etc.), details concerning the user and access permissions. Access permissions include the content the user can access as well as the rights the user has with respect to the content such as to add, edit, delete, modify, etc.

School information (174) will generally include basic facts related to the school and may also include details regarding the school's implementation of eChalk.

Educational Content Data (176) refers broadly to the education related data created, managed or processed by eChalk. Such data can include text, video and/or audio files, web links, calendar entries of school events, class events and any other information users wish to create, manage or process with eChalk.

Third-Party Provider Information (178) includes the identity of third-party providers and the third-party educational content programs that such providers are making available through eChalk. Third-Party Provider information (178) also includes the user identifications and passwords necessary for a user to obtain access to third-party content programs.

eChalk Community Information (180) includes the data on communities that are created within eChalk. Such information includes the identity of the community, the types of users that have or are permitted access to the community, and the methods of information exchange permitted within the community (chat, bulletin boards, etc.).

The categories of data discussed above represent logical groups of data. The present implementation of eChalk uses over 100 database tables to store and maintain the above-described categories of data within the Database Server Computers. In any implementation of the present invention, one skilled in the art would be able to develop a physical implementation of the data (database structure, number of tables, field sizes, etc.) that addresses the needs of the particular implementation. Relevant factors to such a decision might include the expected data volumes, the predicted usage rates, processing speed requirements, and costs.

Very little information needs to be entered before a school can access and begin to utilize eChalk. If a school is being entered as part of a system of schools, these relationships need to be in the Directory Service Processor. These relationships are required for eChalk to perform the ECCS functions for a system of schools as described with respect to FIG. 6 and accompanying text. The only other information needed for each school is a list of students, grades, an Acceptable Use Policy, a School Logo and a School address. All other content is entered by the school's users.

Generally speaking, and without intending to be limiting, there are four ways in which eChalk performs as an ECCS. These are: (1) as an ECCS for a single school; (2) as an ECCS for a system of schools, whether it be a district, county or other school organization; (3) as an ECCS for school communities and (4) as an ECCS for third-party educational content.

An ECCS for a Single School

Figure 4:
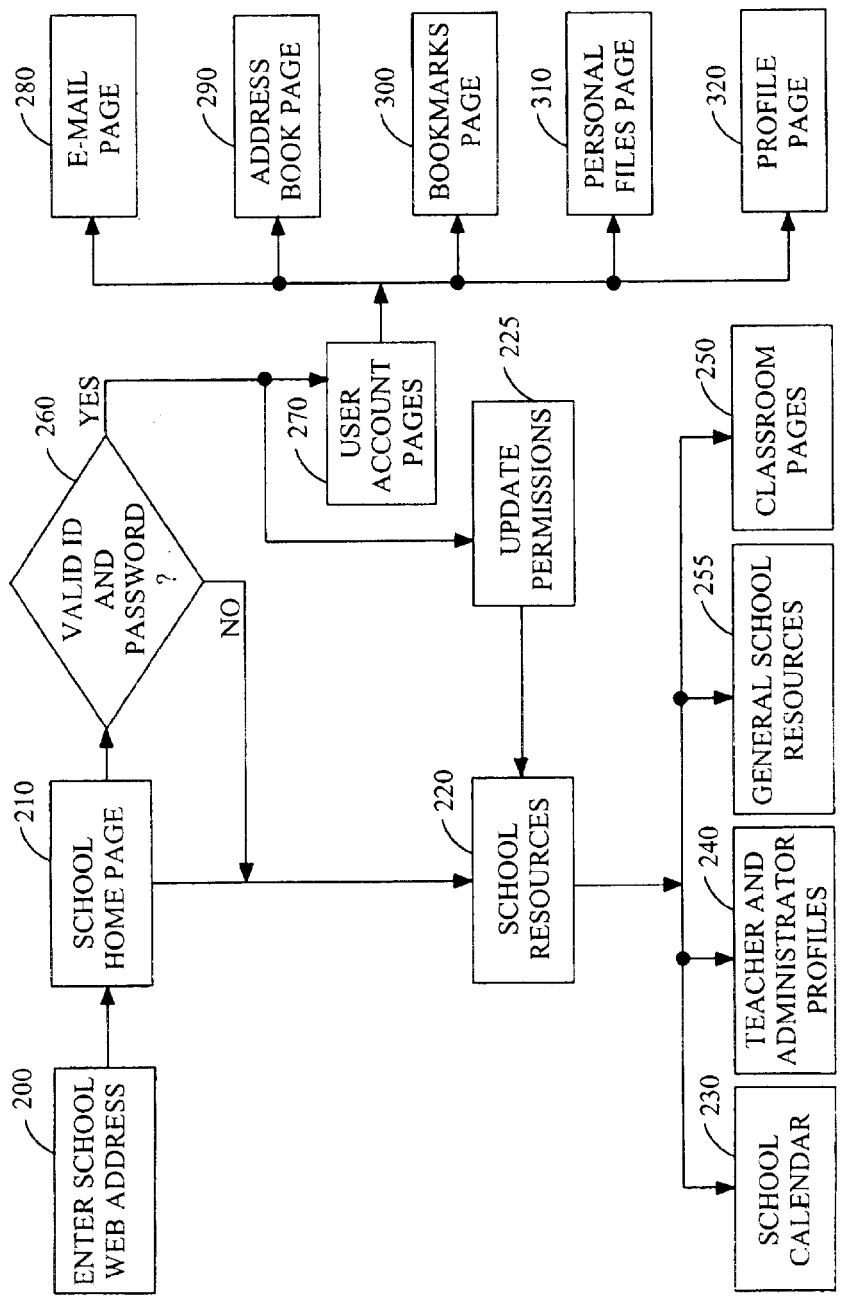
FIG. 4 is a flow chart of the ECCS functions of eChalk within a particular school.

FIG. 4 is a flow chart depicting a user's navigation and the ECCS functions of eChalk within a single school. In particular, what is illustrated is the manner in which a user, whether it be a student, teacher, parent or administrator, can create process and manage educational content data within a single school.

A user's processing of the educational content for a single school is described in the context of this particular illustrative example which consists of a particular set of Web Pages and a particular navigation between these Web Pages. It should be understood that one skilled in the art could, within the scope of the present invention, provide the processing functions described herein using a different interface both with respect to the manner in which the information is exchanged and the layout and navigation of the Web Pages. For example, the invention could be implemented with a different design of the content included on each particular Web Page and with a different navigation between Web Pages. In addition, the present invention could be implemented over a network of computers without using Web Pages or standard Internet protocols.

The starting point for a user to obtain access and be able to process the educational content for his or her school is to Enter the School Web Address (200). Each school with access to eChalk is assigned its own Web address. In response to a user entering the Web Address on an Internet Browser, eChalk will retrieve the general school information that has been stored for the school entered and display the School Home Page (210). Without entering a valid user identification and password, a user can obtain through the Home Page access to certain School Resources (220) that have been made generally available to the public. By entering a user identification and password, the Valid ID and Password (260) function will authenticate whether the user is properly registered. If the user is registered, the Update Permissions (225) function will make available additional School Resources (220) based upon the permissions assigned to the user. A school has the flexibility to make some, all or none of the School Resources accessible to the public depending on the permissions assigned.

School Resources

The School Home Page (210) is a publicly available page accessible to anyone with an interest in the school. From the School Home Page (210), anyone can access School Resources (220) that are available concerning the school to the extent a school has decided to make such resources available to the public. If a user enters a valid identification and password, the user will also have access to any non-public School Resources (220) the user is permitted to see based upon the permissions assigned to the user.

One of the School Resources (220) that can be accessed by executing a link from the Home Page is the School Calendar (230). The School Calendar (230) displays the dates of school events and whatever information the school wishes to make available concerning these events. The School Calendar (230) can be set up so that certain events and/or information relating to those events is only available to all or certain groups of users with valid identifications and passwords.

By executing a link from the School Home Page (210), the user can also access Teachers and Administrator Profiles (240). In these profiles, a teacher or administrator can enter general information specific to them such as the grades, subjects and courses they teach, office hours, biography, schedule, message and links. The teacher or administrator can choose to make their profile public or private. If it is made private, then only users with valid User ID and passwords will be able to view the profiles. Like almost all of the features on the eChalk system, profiles can be subjected to rules set up by the district, school, teachers, and/or individual user.

Another School Resource (220) that can be access from the School Home Page (210) is the Classroom Pages (250). Classroom Pages (250) are the users' link to educational resources for particular classes. From the Classroom Pages (250), a user can execute links to obtain the listing of all faculty and staff associated with the class, view upcoming events (homework, test dates, project dates and more), access resources (links, documents, etc) for the class and share information with others within the class. With respect to permissions to view Classroom Pages (250), an example of how a school might set up these pages is to provide the students with read access to each class the student is enrolled in and the teachers with read and write access for each class they are teaching. Of course, the above is just an example. eChalk permits any combination of permissions a school would like to set from restricting Classroom Pages (250) to particular teachers and students of specific classes or making them available to everyone including the general public.

Finally, from the School Home Page (210), a user can access General School Resources (255). General School Resources (255) are a users' link to whatever other additional educational resources a school would like to make available. Any type of educational content can be made available in General School Resources (255). In the illustrative embodiment, one example of General School Resources (255) that a user can access is the listing of all faculty and staff within the school including a listing of all the teachers for a particular subject. Another example of General School Resources (255) a user can access is Web links of school information or links to the Web that have been posted as resources. Again, all of the information including within School Resources (255) can be set up so all, some, or none of the information is accessible to the general public.

User Account Pages

In addition to the School Resources, eChalk also makes available educational content in a set of User Account Pages. If the Valid User ID and Password (260) function validates the identification information entered, eChalk will retrieve the user's relevant data and Display the User Account Pages (270). The educational content that will be displayed and/or is accessible through the User Account Pages is educational content specific to the user, which the user has created or is made available to the user.

The pages a user can access using links from the User Account Page are an E-Mail Page (280), an Address Book Page (290), a Bookmarks Page (300), a Personal Files Page (310), and a User Profile Page (330).

The E-Mail Page (280) provides the users with all the features normally associated with e-mail such as writing and sending e-mail, checking and receiving e-mail, filing e-mail in folders and searching e-mail. But in addition to the standard email features, eChalk's email features allow parameters to be set regarding who can send and receive email from whom both within a school community and outside the school community. These user parameters can be set by an administrator at the school level or by an administrator at the District or some other organizational level depending on the particular implementation.

The E-mail Page (280) also comes with a "Report Misuse" link, which is also accessible from every page on the eChalk system. This permits a user to identify any email not in compliance with the policies that have been established. This, combined with the ability to filter email for content, phrases or words assists in keeping the system secure for users within the school. Lastly, every email and attachment to email messages are searched by eChalk for viruses in an effort to further protect a users computer from inappropriate or malicious documents and files.

The Address Book Page (290) permits users to enter and save e-mail addresses and other information. These email addresses can be organized into group lists that can then be shared within a school or even district (allowing access to all users or just certain individuals or user types).

The Bookmarks Page (300) permits users to store links to other sites on the Internet, save them according to category and, if the user is provided the capability, share them with other users.

The Personal Files Page (310) allows users to store any type of educational content file they would like to save and, if the user is given access to this capability, the user can specify other users who can access the files. This feature is particularly useful for administrators and teachers. An example of how a teacher might use this capability is to share a file for all other teachers in a school or access a file that is made available to them from a district office. Teachers can also share files right into a student's account though they would most likely use the Classroom Pages (250) to do this instead.

The Profile Page (320) is available to all users. If the user is a teacher or administrator, the page is the same as what will be displayed in the Teacher and Administrator Profiles (240) that was discussed as part of School Resources (220). Through eChalk, a student can also set up his or her own Profile Page (320). As with profile pages for teachers and administrators, the pages can be set up to be public, private or any combination thereof depending on rules set up by the district, school, teachers, and/or individual user.

An ECCS for a System of Schools

The present invention can provide an ECCS that supports any hierarchy of schools. For example, a public school system within a particular state consisting of a hierarchy of 1000 schools, 125 school district administration offices, 15 county administration offices, and one state administration office can all be defined within eChalk so that each administration level can manage and process the educational content of the administration offices and schools for which each level is responsible. As noted previously, these hierarchies are defined in the Directory Service Processor (140) when a system of schools is entered within eChalk so that the ECCS knows what the relationships are between each of the schools.

Figure 5:
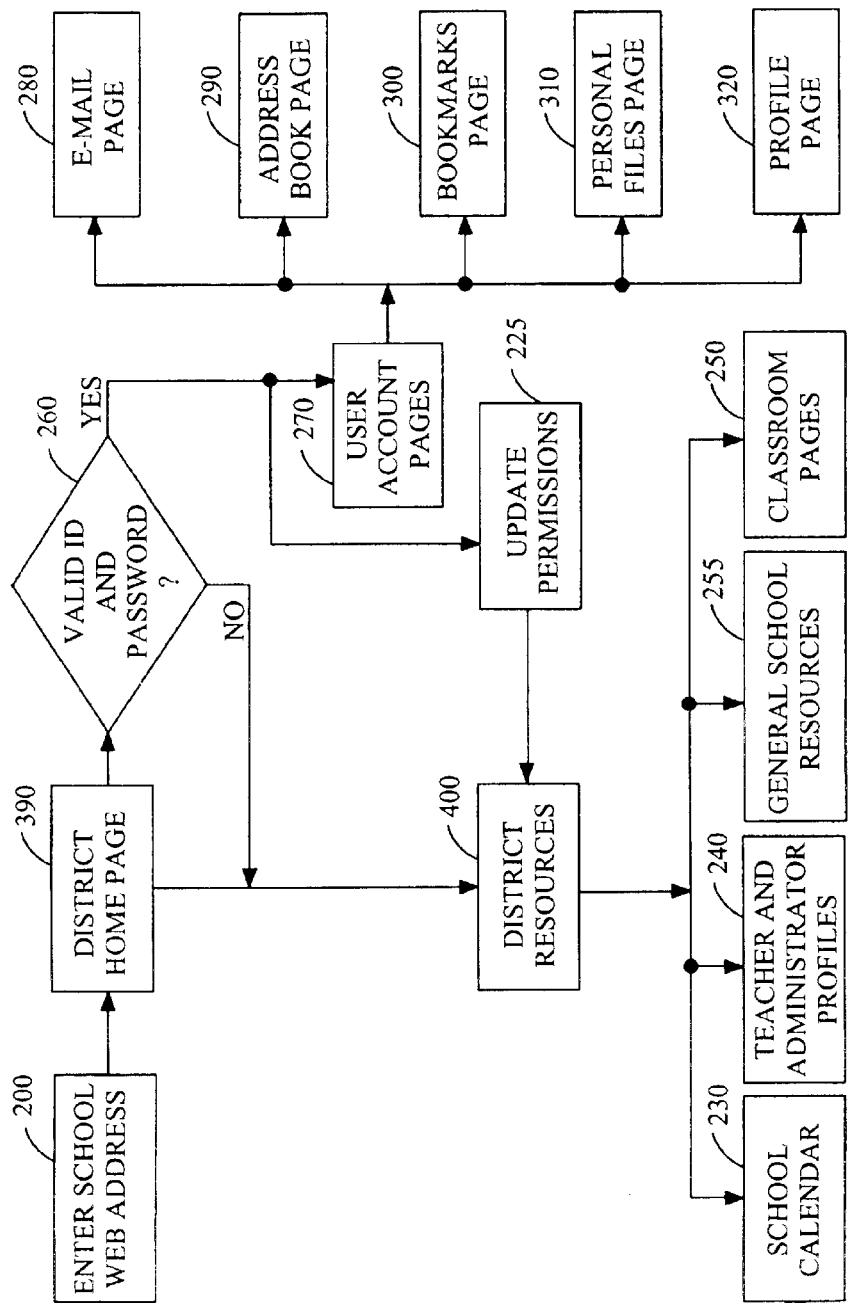
FIG. 5 is a flow chart of the ECCS functions of eChalk within a system of schools.

Referring now to FIG. 5, a flow chart is shown depicting a user's navigation and the ECCS functions of eChalk within a system of schools. In particular, what is shown are the functions that can be performed by an administrator responsible for managing a group or system of schools.

Like with a school site, the initial step is to enter the School Web Address (200). By way of example, for the simple system of schools example shown in FIG. 2, the administrators for District A would be provided with a specific Web address for its own District Site. The difference with a District Site is that eChalk will recognize the address as a District Site and return a District Home Page (390). Like the School Home Page, this will be a page of publicly available content but the content will be related to the District Entity.

By entering a valid User ID and password, a district administrator can access the User Account Pages of the District Site if the Valid User ID and Password (260) function validates the administrator. From the User Account Pages, an administrator has access to the same personal pages to which a teacher has access within a school site but at the District level. These pages include an E-Mail Page (280), an Address Book (290), Bookmarks (300), Personal Files (310), and a Profile Page (320). One difference with the Personal Files Page (310) is that the administrator of an district entity can specify educational content that can be shared with users (generally this will be limited to teachers and administrators) of schools that have been defined as being part of the district entity. This can be scaled up for any hierarchy that has been defined. So, for example, a district administrator who is responsible for three schools can share content with users in the schools. A county administrator could share information with the districts within said county and the schools of each district.

eChalk can determine what schools and/or users should have access because the organizational hierarchy is known and defined in eChalk as part of the Directory Service Processor (140). Thus, when a district administrator, for example, creates a file to share with all teachers within the district, the Directory Service Processor (140) is accessed to determine what the schools are within the district and what teachers are within the school. Based on this hierarchy, the databases in which the shared file is stored will identify the users that have access to the file and what their permissions are with respect to the file.

The District Resources (400) within an Administrative Site are the same as for a school site except that a user of an Administrative Site has access to and can post information on the School Calendars (230) for all the schools within the district. In the simple example School District shown in FIG. 2, an administrator for District A would have access to and could post calendar information on the calendars for School 1 and School 2. Again, the hierarchy information maintained in the Directory Service Processor (140) is used to determine what schools are within the district. In eChalk, events posted by a district administrator are shown in a different color to distinguish the district events from other school events. Like file sharing, the calendar functions can be scaled up so a county administrator could, for example, post on the calendars of various school districts and/or the schools within said districts.

To emphasize again, an important point of this invention is that the organizational features can be scaled up for any hierarchy that a school wishes to define. Thus, if for example a county office wanted an ECCS to process and manage educational content for a certain number of school districts, the county office would be provided with its own Web address that would return a an Administrative Home Page for the county. The Home Page would function in a similar manner as the Home Page for a district office except that county administrators would be able to share educational content with both the school district offices within the county and each of the schools within the school district.

The present invention is not limited to the typical public school hierarchy of a School District, County Offices, and a State Office. For example, a system of parochial schools, which may have very different organizational groups can be implemented as long as there is an organizational hierarchy that can be defined and maintained in the Directory Service Processor.

An ECCS for a School Community eChalk supports the ECCS functions of a school community by allowing the school's teachers or administrators to define particular communities of eChalk users. Depending on the choice of a particular school organization, these communities can be defined by administrators within a particular school or by administrators within the system of schools such as an administrator for a School District.

There is no limit to how eChalk users can be grouped into school communities. For example, these school communities can be limited to teachers such as a school community for seventh grade math teachers to share and discuss issues related to teaching math. The school communities can be primarily geared for students such as the chess club where students can post events and discuss issues related to chess. In eChalk, each student related club requires one teacher or administrator to serve as a faculty advisor although the school communities could be set up without the requirement of a faculty advisor. School communities can be set up to be limited to eChalk users within a particular system of schools or they can be set up to include any eChalk user regardless of the system of schools to which the user belongs.

Figure 6:
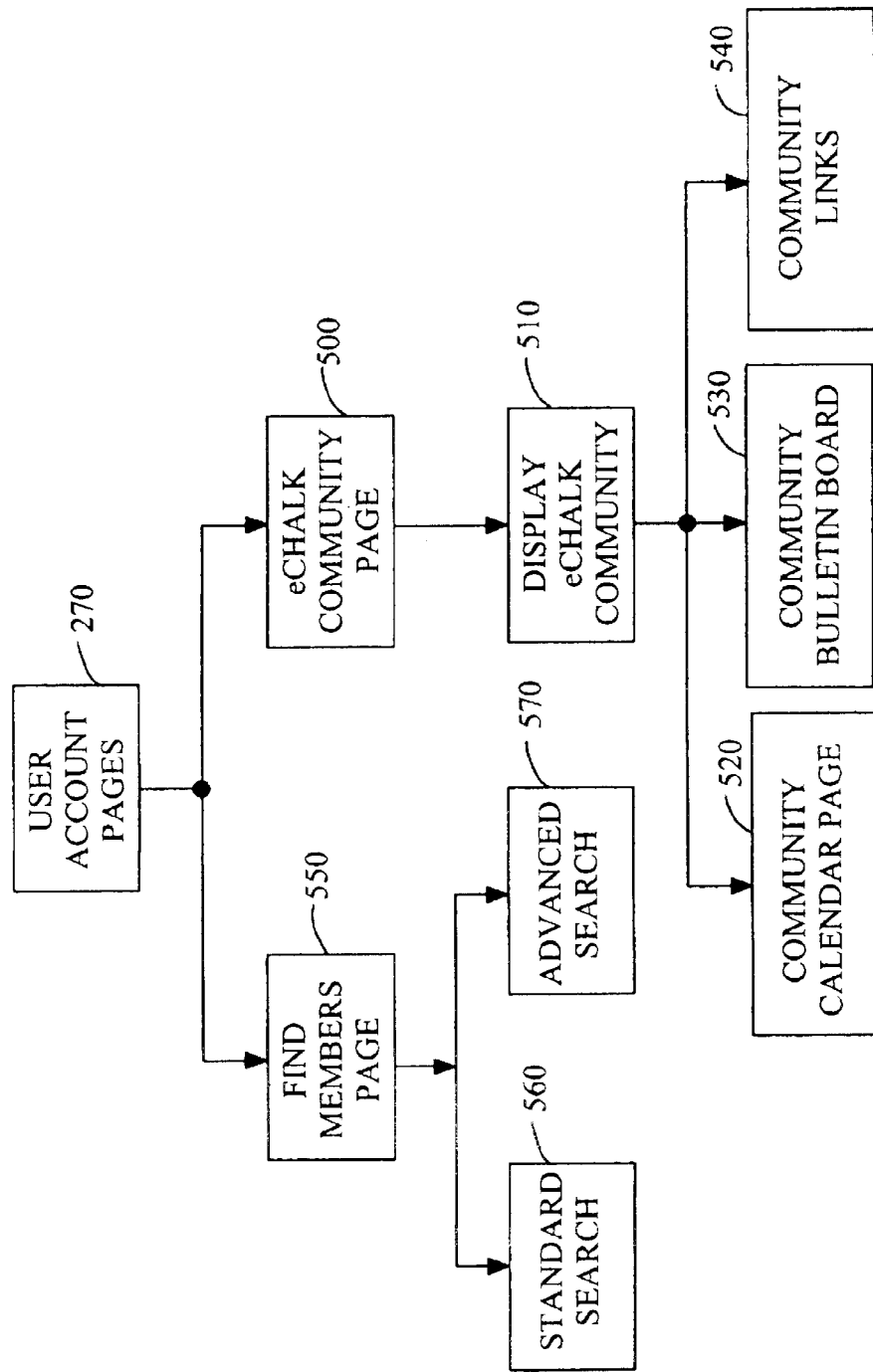
FIG. 6 is a flow chart of the ECCS functions of eChalk related to school communities.

Referring now to FIG. 6, a flow chart is depicted of the ECCS functions that eChalk supports for a school community. To access these functions, the user must logon to the particular school and/or administrative site to which the user has access. A successful login displays the User Account Pages (270). Then, from the User Account Pages (270), a user is provided with a link to eChalk communities. By accessing the eChalk communities' link, the user is returned the eChalk Community Page (500), which displays the icon for each of the school communities to which the user has access. To select a particular community, the user clicks on the icon for the community, which functions to Display the eChalk Community Page (510) for the community selected. The communities can be set up to support any standard information exchange methods. In the illustrative example described here, the communities consist of a Community Calendar Page (520) for posting of events relating to the community, a Community Bulletin Board (530) for posting and responding to messages from others in the community, and Community Links (540) that community users can enter and access.

Another feature that is related to the school community but somewhat different is the Find Members function. It is discussed here because it relates to eChalk-wide school community functions. Referring again to FIG. 6, a user can execute links to the Find Members Page (550) from the User Account Pages (270). From the page, the user can search for members within a school, within a school district, across the entire state where the school is located, or throughout all of the schools included in eChalk. By clicking on Advanced Search, the user can narrow the search down to a type of user (student, teacher, etc.), the student's grade and status (active, inactive, etc.), subjects taught, personal identifier, etc.

An ECCS for Third-Party Content Providers

For all the third-party educational content that is made available to the school's users through eChalk, an administrator will designate which students have access to what third-party educational content, and for each student that has access to educational content, an administrator will store the students User ID and password for each third-party educational content programs.

Figure 7:
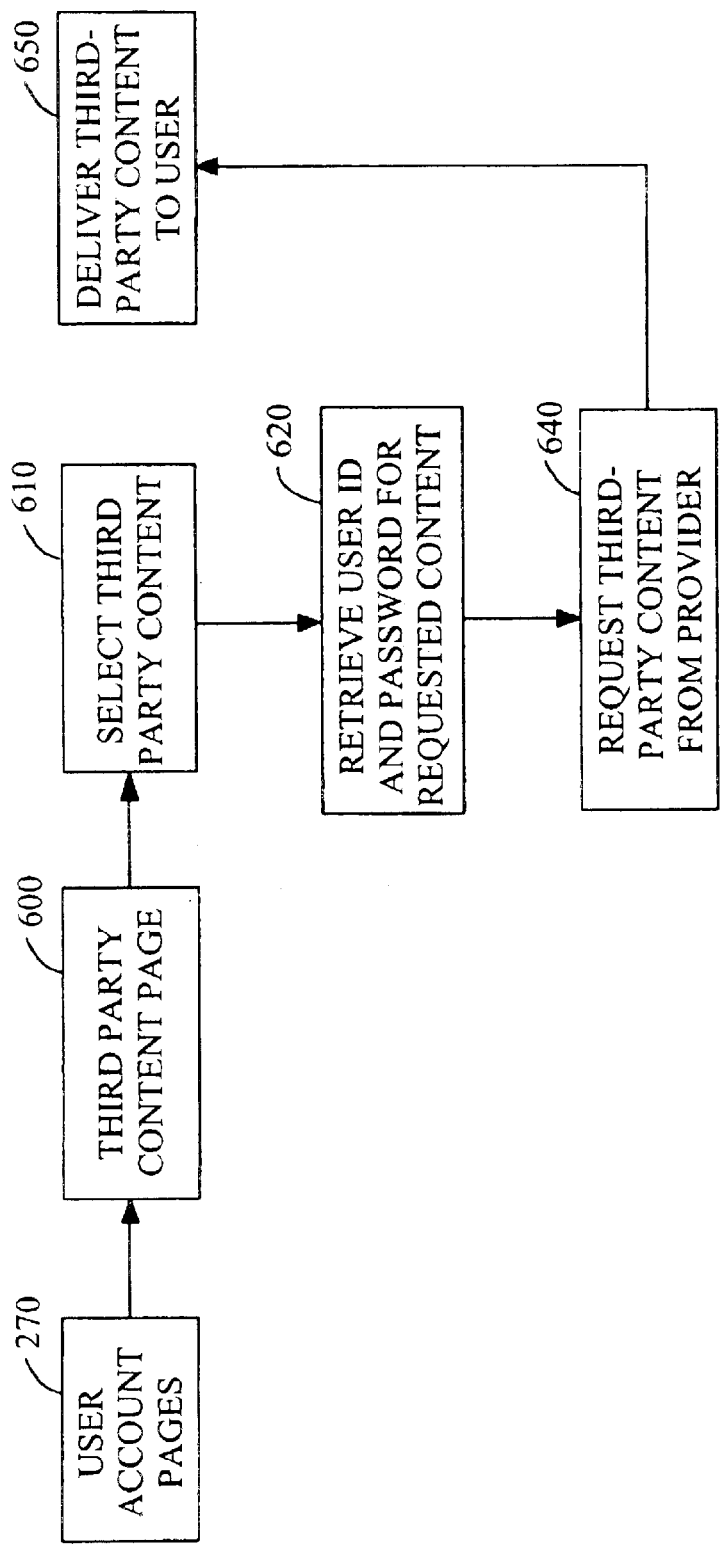
FIG. 7 is a flow chart of the ECCS functions of eChalk related to third-party educational content providers.

Referring now to FIG. 7, a flow chart is shown of the ECCS functions of eChalk related to third-party educational content. From the User Account Pages (270), a user can access a link for third-party education content. eChalk will return the Third Party Content Page (600), which displays an icon for each third-party educational content program to which the user has been provided access. From this page, a user can perform the Select Third Party Content (610) function by selecting the icon for the desired third-party educational content program. eChalk will first retrieve the User Id and Password for the Requested Content (620) from the appropriate database and then Request the Third-Party Content (640) from the provider using the proper user identification and password for the content.

Figure 2:
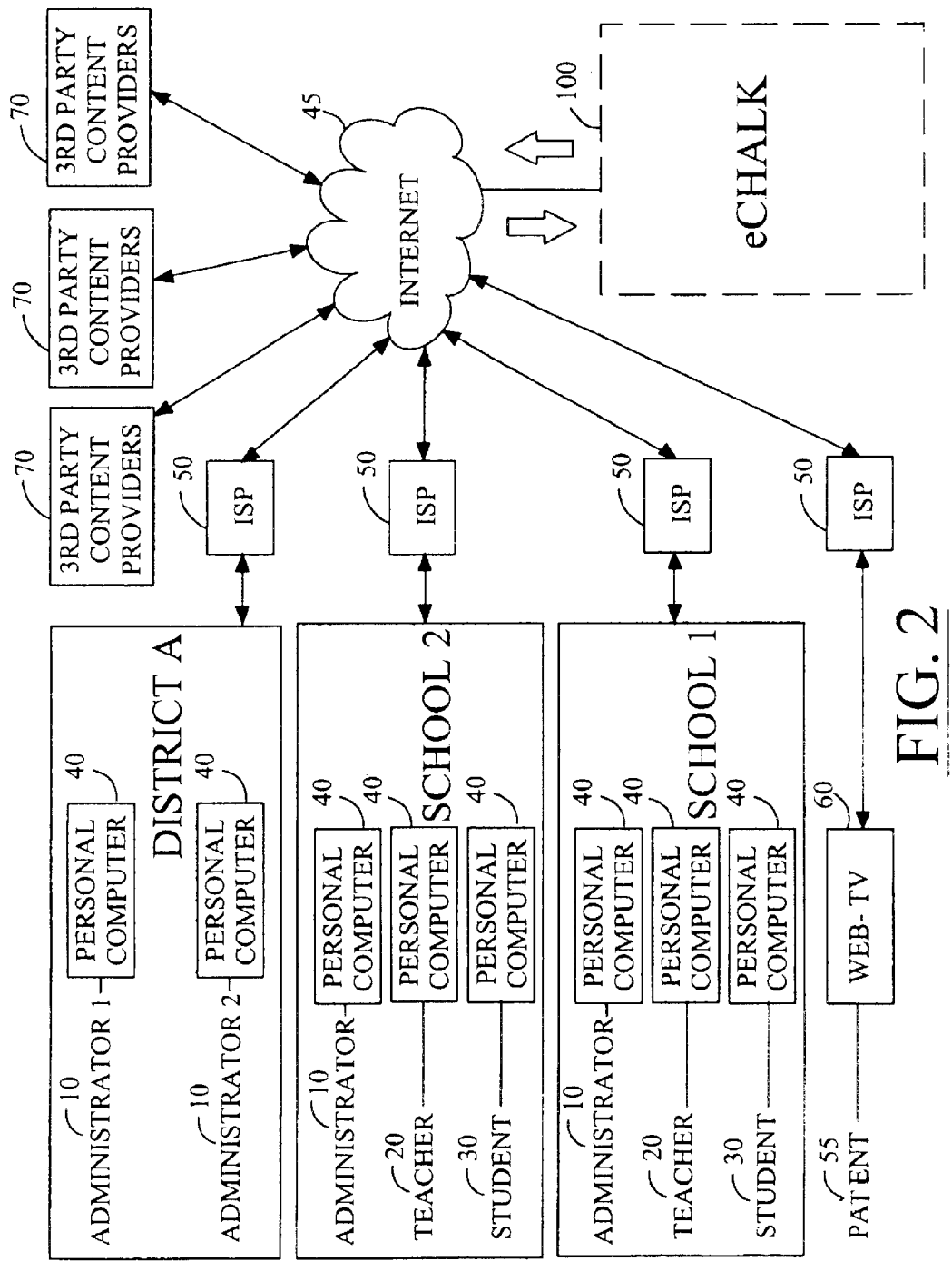
FIG. 2 represents an example of a school environment in which multiple users from multiple schools and multiple third party educational content providers are connected through the Internet to eChalk.

Referring now to FIG. 2, which depicts a sample environment for the present invention with links to third-party providers, eChalk's content request will be delivered to the third-party educational content provider (70), who upon authorization that the user identification and password is valid, will deliver the requested content to eChalk (100) through the Internet (45). In turn, eChalk (100) will then deliver the third-party content to the user through the Internet (45). The function of Deliver Third-Party Content to User (650) shown on FIG. 7 refers to the above function of eChalk delivering the content to the user once a request has been made.

In this process, eChalk is the communications link through the Internet for transmitting educational content to the school's users. A student does not need to remember a dozen different user identifications and passwords to access multiple third-party content programs. All the student needs to remember is his or her User ID and Password for eChalk to gain access to any of the third-party content programs he is authorized to receive. This has tremendous benefits for the school as well. An administrator can easily manage what programs a student can access and save the time and costs which would inevitably be expended with students losing or not remembering what their user identifications and passwords are to each of these third-party content programs.

Management of Educational Data

As noted previously, students and teachers have some tools to create and share content through their own personal pages. In addition to these functions, however, eChalk permits certain users, who are defined as Site Administrators or Site Managers, to have greater access to managing the school's education content. If a user has this access, the user will have access to site data management functions.

Referring back to FIG. 3, a user with access to site management functions will have access to the Manage Site Page (700). From the Manage Site Page (700), a user such as a school administrator can add, modify and delete the categories of data shown in FIG. 3.

With respect to User Information (172), a site administrator can, from the Manage Site Pages, add, edit and delete the users who have access to the private educational content managed through eChalk. The administrator can also manage each user's account including promoting/demoting to the next/previous grade and graduation.

For School Information (174), the Manage Site Page allows a site administrator to enter, edit and/or view basic information about the school and the school's implementation of eChalk. They can also select different users to have the ability to post information on the home page such as the Principal's Message.

For Educational Content Data (176), the Manage Site Page allows a site administrator to manage calendar information by creating, editing and/or deleting information posted on a school's calendar including announcements. The site administrator can also designate whether the information being posted on the calendar will be accessible to the public or limited to users with a valid User ID and password. If the site administrator is at a district site or other site within the administrative hierarchy of a system of the schools, the site administrator can add, delete and edit content on the calendars of the schools that are below them in the hierarchy.

For other Educational Content Data (176), a site administrator can create and post links, create web pages, upload files and content (defined as almost any content—text, audio, video, graphic, html, etc), create interactive pages (such as surveys) and—in each case—have them made public to all on the Internet or kept private to a the schools or groups located within a school.

For Third-Party Content Provider Information (178), a site administrator can add, delete and edit content relating to the third-party content programs. The information that can be entered, deleted and edited includes the name of the provider, the programs that are offered by the provider, the users that will have access to the programs, and the User Ids and passwords that the third-party provider has assigned to the school's user. This information is what determines what third-party programs are displayed when a user displays the Third-Party Content Page (600) in FIG. 6. If the user has been defined as having access to the program, an icon for the program is displayed on the Third Party Content Page (600)

For eChalk Community Information (180), a site administrator, can add, delete and edit eChalk community information. A site administrator can define a community and who will have access to the community. There are several ways this can be done. A site administrator may create a community that is limited to certain students in one school. For example, a site administrator might create a Drama Club community and restrict access to certain students within a school. A site administrator of a district site can create a community that is restricted to users within a particular school district. A site administrator can also create a community that is open to users from other schools. When a site administrator defines a community in this manner, the site administrators for other schools within eChalk will see this as a community that is available to their users and can decide whether on not they want their users to have access.

The Directory Service Data (170) is handled somewhat differently. As noted previously, Directory Service Data (170) is the relationship data that permits eChalk to associate each user (whether such user be a student, teacher, parent or administrator or other) with a particular school or other administrative entity such as a school district and with any eChalk communities that have been defined. If a system of schools is being managed by eChalk, the Directory Service Data (170) will include what schools belong to the system of schools and what the relationships are between the schools and other administrative entities established to manage a school. In this illustrative example, the relationships between the schools within a system of schools are defined and entered into the Directory Service Processor (140) by a group with responsibility for overseeing all the schools and/or system of schools managed by eChalk. A site administrator for a particular school or system of schools does not have access to change these relationships. However, other relationship information such as associating a particular user to a school is managed through the Manage Site Page (700).

The data management functions described here are illustrative of one way in which the data could be managed. Consistent with the present invention, various pages and other methods could be used to create, modify and/or delete any of the categories of data managed by the present invention.

What is claimed is:

1. An educational content communications system for processing and managing educational content of at least one school, comprising:

at least one server computer and at least one client computer including, respectively, server and client processors for executing server and client input and output elements for communication between said server and client computers; and said at least one server computer further including:

a user database for storing unique identification information related to users of said client computers, said users each comprising one of: students, teachers, parents and administrators;

an educational content database for storing educational content that is created, managed and processed by said users;

user access means for allowing users to create, process and manage said educational content for said at least one school;

user management means for allowing administrators to define the educational content said users can create, manage and process;

means for identifying, for each of the users, third-party educational content programs to which that user has access;

means for obtaining, from a third-party educational content provider of said third-party educational content programs, user identifier and password information for each of the users that have access to said third-party educational content programs;

means for storing said user identifier and password information for each of the users, and for each of said third-party educational content programs to which the users have access;

means for reguesting, from said third-party educational content provider, a third-party educational content program selected by a particular user to which said particular user has access, by sending said user identifier and password information corresponding to the particular user to said third-party educational content provider; and means for delivering the requested third-party educational content program to said particular user.

2. The educational content communication system of claim 1, wherein said user database and said education content database reside in at least one database server.

3. The educational content communications system of claim 1, further comprising an e-mail server, which enables said users to send and receive e-mail messages.

4. The educational content communications system of claim 1, wherein the at least one server computer includes a calendaring means for allowing said users to process and manage calendar events data for said at least one school.

5. The educational content communications system of claim 1, wherein the at least one server computer includes a file creation means for allowing users to create a file and save said file so that said file is accessible only to said user that created said file.

6. The educational content communication systems of claim 5, wherein the at least one server computer includes a file sharing means for allowing said users that create said files designate specific users who are permitted access to said created files.

7. The educational content communications system of claim 1, wherein the at least one server computer comprises a Web server and said client computers include a Web browser.

8. The educational content communications system of claim 1, wherein said at least one server computer includes a directory service processor which maintains the relationship data between said at least one school and said users, the relationship data including which of said users belong to which of said at least one school.

9. The educational content communications system of claim 1, wherein said at least one server computer further includes a classroom means for allowing users to process and manage said educational content on a class by class basis.

10. An educational content communications system for processing and managing education content within at least one school system, comprising:

at least one server computer and a plurality of client computers including, respectively, server and client processors for executing server and client input and output elements for communication between said at least one server and client computers; and the at least server computer further including:

a user database for storing unique user identification information for users of said client computers, each of said users comprising one of: students, teachers, parents and administrators associated with the at least one school system, an educational content database for storing educational content that is created, managed and processed by said users;

user access means for allowing said users to create, process and manage said educational content for the at least one school system;

user management means for allowing administrators to define what educational content said user can create, manage and process;

directory service means for maintaining relationship data between said at least one school system and said users, including schools that are within said at least one school system, what administrative entities are responsible for said at least one school system, and which of said users belongs to which of said schools means for identifying, for each of the users, third-party educational content programs to which that user has access;

means for obtaining, from a third-party educational content provider of said third-party educational content programs, user identifier and password information for each of the users that have access to said third-party educational content programs;

means for storing said user identifier and password information for each of the users, and for each of said third-party educational content programs to which the users have access;

means for requesting, from said third-party educational content provider, a third-party educational content program selected by a particular user to which said particular user has access, by sending said user identifier and password information corresponding to the particular user to said third-party educational content provider; and means for delivering the requested third-party educational content program to said particular user.

11. The educational content communication system of claim 10, wherein said user database and said educational content database reside in at least one database server.

12. The educational content communications system of claim 10, further comprising an e-mail server, which enables said users to send and receive e-mail messages.

13. The educational content communications system of claim 10, wherein said at least one server computer further includes calendaring means for enabling the users to process and manage calendar events data for said at least one school system.

14. The educational content communications system of claim 10, wherein the at least one server computer further includes file creation means for enabling said users to create a file and save said file so that said file is accessible only to said users that created said file.

15. The educational content communication systems of claim 14, wherein the at least one server computer further includes file sharing means for enabling said users that create said files to designate specific users who are permitted access to said created files.

16. The educational content communications system of claim 10, wherein the at least one server computer comprises a Web server and said client computers include a Web browser.

17. The educational content communications system of claim 10, wherein the at least one server computer further includes a find members means for enabling the users to locate and find any stored profile information on another of said users that is stored in said user database.

18. An educational content communications system for processing and managing education content from third party providers, comprising:

at lease one server computer and a plurality of client computers including, respectively, server and client processors for executing server and client input and output elements for communication between said server and client computers; and said at least one server computer further including;

means for generating unique user identification information for a plurality of users of the client computers, the plurality of users each comprising one of: a parent, a teacher, an administrator and a student associated with a school;

means for obtaining, from a third-party provider of third-party educational content programs, user identifier and password information for each user associated with the school;

a third-party provider information database for storing data identifying said third-party provider and said third-party educational content programs that are offered to the users, the third-party provider information database further storing data identifying which of said users have access to which of said third-party educational content programs, and the user identifier and password information for each of said users having access to said third-party educational content programs;

third-party provider management means for allowing the administrator to create, process and manage which of said third-party educational content programs each of said users can access, and said user identifier and password information for each of said third-party educational content programs; and a third-party provider processing means for responding to user requests for a third-party educational content program to which said users have access by retrieving said user identification and password information for said third-party educational content program from said third-party provider information database, transmitting said request for the third-party educational content program to said third-party provider with said user identifier and password information, and delivering said third-party educational content program to said users.

19. The educational content communication system of claim 18, wherein said third-party provider information database resides in at least one database server.

20. The educational content communications system of claim 18, wherein the at least one server computer further comprises a Web server and said client computers include a Web browser.

21. An educational content communications system for processing and managing education content within school communities comprising: at least one server computer and plurality of client computers including, respectively, server and client processors for executing server and client input and output elements for communication between said server and client computers; and said at least one server computer further including:

a user database including unique identification information related to users of said client computers, said users including at least one of students, teachers, parents and administrators associated with each of said school communities;

a community information database including data identifying said school communities that said users have created, data on said users that have access to said school communities, and educational content created by said users that have access to said school communities;

a school community management means for enabling administrators in each of said school communities to define said school communities to which each of said users can access;

school community access means for enabling each of said users at each of said school communities to create, process and manage said educational content for each of said school communities;

directory service means that maintain relationship data between said school communities and said users, including which of said users belong to which of said school communities;

means for identifying, for each of said users, third-party educational content programs to which that user has access;

means for obtaining, from a third-party educational content provider of said third-party educational content programs, user identifier and password information for each of said users that has access to said third-party educational content programs;

means for storing said user identifier and password information for each of said users, and for each of said third-party educational content programs to which that user has access;

means for requesting, from said third-party educational content provider, a third-party educational content program selected by a particular user to which said particular user has access, by sending said user identifier and password information corresponding to the particular user to said third-party educational content provider; and means for delivering the requested third-party educational content program to said particular user.

22. The educational content communication system of claim 21, wherein said community information database and said user database resides in at least one database server.

23. The educational content communications system of claim 21, wherein said school community access means further includes a bulletin board in which each of said users with access to one of said school communities can post and respond to messages from other users with access to that school community.

24. The educational content communications system of claim 21, wherein said school community access means further provides links to information related to said school communities.

25. The educational content communications system of claim 21, wherein the at least one server computer further includes a calendaring means wherein said users can create, process and manage calendar events data for each of said school communities to which said users have access.

26. The educational content communications system of claim 21, wherein the at least one server computer is configured as a Web server and said client computers include a Web browser.

27. A method of providing third-party educational content programs available over the Internet to school users, comprising:

generating unique student identification information for each student in a school;

identifying, for each student, third-party educational content programs to which that student has access;

obtaining, from a third-party educational content provider of said third-party educational content programs, user identification and password information for each student who has access to said third-party educational content programs;

storing said user identification and password information for each student and for each of said third-party educational content programs to which that student has access;

requesting, from said third-party educational content provider, a third-party educational content program selected by a particular student to which said particular student has access, by sending said user identification and password information corresponding to the particular student to said third-party educational content provider; and delivering the requested third-party educational content program to said particular student.

* * * * *